Patented Feb. 26, 1924.

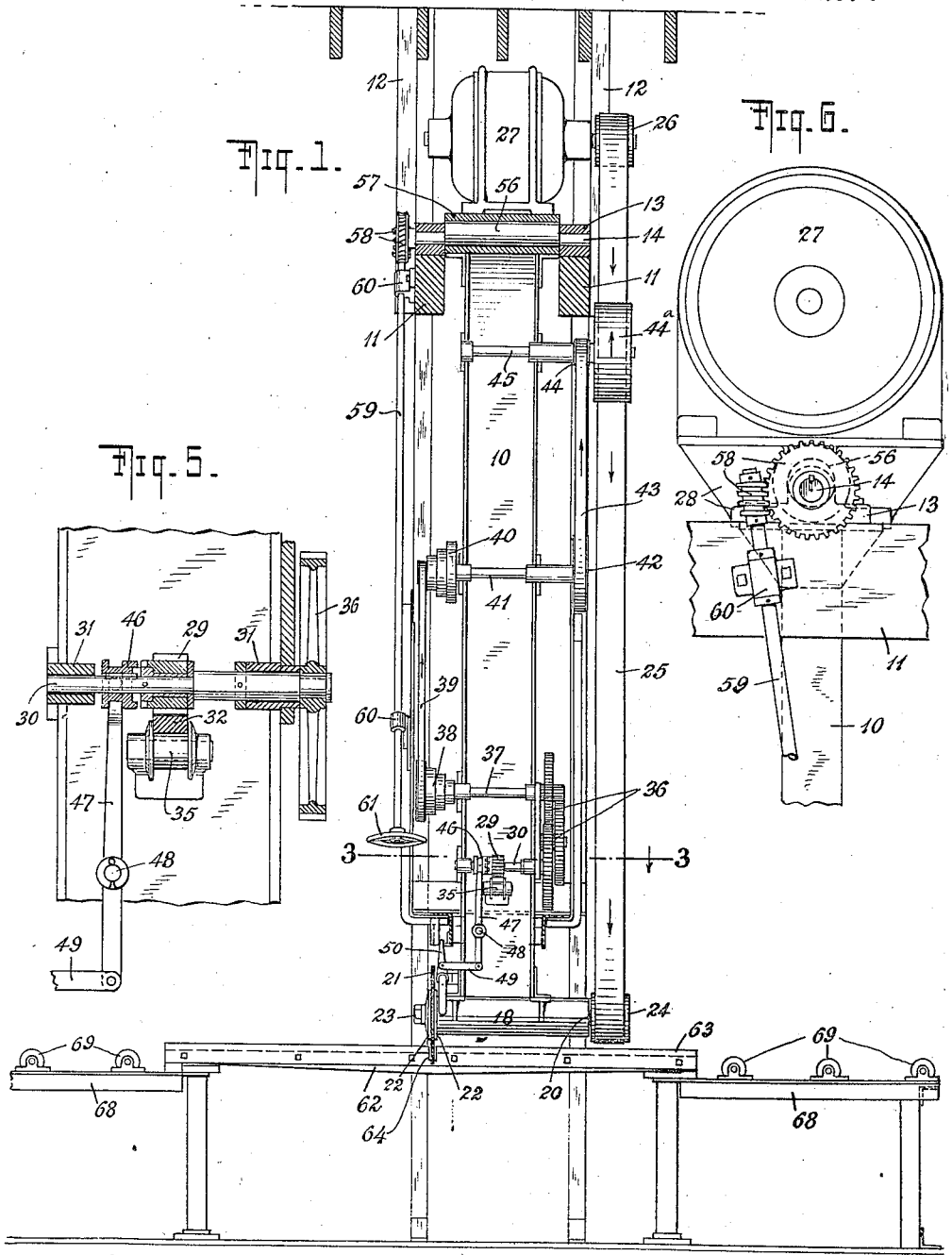

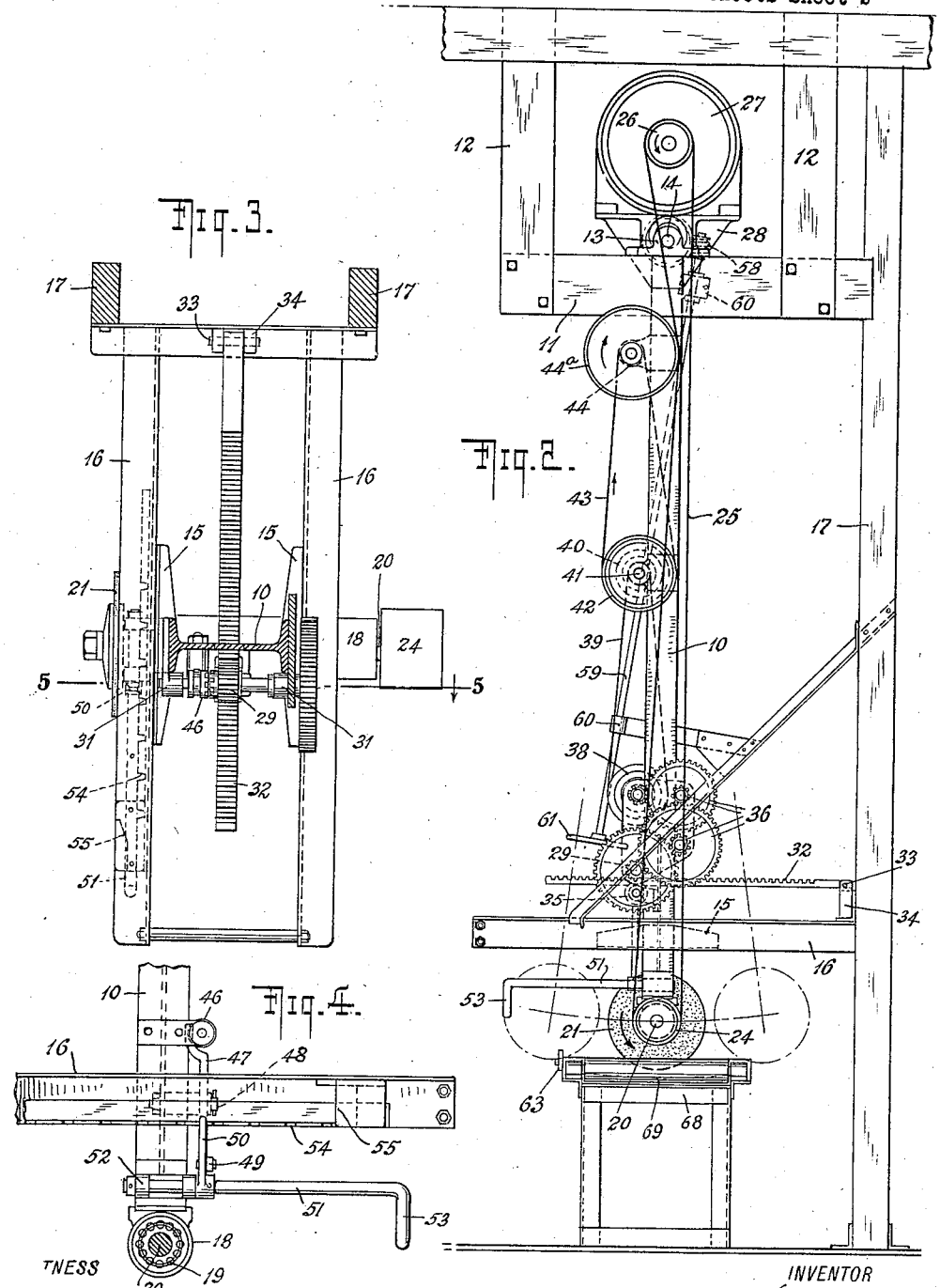

1,485,101

UNITED STATES PATENT OFFICE.

JULIUS WEGNER, OF NEW YORK, N. Y.

SWING SAW.

Application filed July 24, 1922. Serial No. 576,938.

*To all whom it may concern:*

Be it known that I, JULIUS WEGNER, a citizen of the United States of America, and a resident of the borough and county of Queens, city and State of New York, have invented certain new and useful Improvements in Swing Saws, of which the following is a specification.

My invention relates to saws and has for its object to provide a swing saw of novel and simple construction adapted more particularly for the cutting of marble and other stones in an efficient and reliable manner. Other more specific objects of my invention will appear from the description hereinafter and the features of novelty will be pointed out in the appended claim.

In the accompanying drawings, which illustrate an example of the invention without defining its limits, Figure 1 is a front elevation, partly in section, of my improved saw; Fig. 2 is a side elevation thereof; Fig. 3 is a detail section, on an enlarged scale, on the line 3—3 of Fig. 1; Fig. 4 is a detail side view; Fig. 5 is a detail section on the line 5—5 of Fig. 3, and Fig. 6 is a fragmentary side view of the upper end of the saw on an enlarged scale.

As shown in the illustrated example, the saw comprises a support 10 of any suitable form and construction and consisting, for instance, of an I-beam or frame pivotally suspended from suitable stationary fixtures. In the drawings, the stationary fixtures consist of parallel beams 11 and suspension members 12, and carry bearings 13 in which trunnions 14 are journalled. The trunnions 14, in combination with an eccentric, to be referred to later on in the description, constitute the axis about which the support or frame 10 is adapted to move in a pivotal path, as will be more fully described hereinafter; the frame or support 10 is maintained against deviation from its pivotal paths by means of shoes 15 mounted upon said frame and arranged to travel between and in contact with the side members of a stationary, horizontal frame 16 fixed upon a suitable support as, for instance, an upright 17. At its lower end the frame or support 10 is provided with a tubular bearing 18 preferably provided at opposite ends with ball bearings 19 in which a shaft 20 is rotatably mounted; the latter may be maintained against lengthwise movement relatively to said ball bearings 19 in any suitable manner. At its one end the shaft 20 carries a rotatable cutting member 21, which may be constructed in any convenient form suitable for the work for which it is intended, and in the illustrated example is shown in the form of a carborundum disk; the latter is fixed upon the shaft 20 in any convenient manner, as by means of washers 22 and a nut 23, screwed upon the screw-threaded end of the shaft. At its opposite end the latter is provided with a belt pulley 24 operatively connected by means of a belt 25 with the pulley 26 of an electric motor 27. The latter is mounted in any suitable co-operative relation to the frame 10 to perform its functions as a driving medium for actuating the rotatable cutter 21, and in the illustrated example is carried by the frame 10 so as to partake of the movements thereof, the upper portion of said frame, in such case, being constructed in the form of a bracket 28 upon which said motor is fixed. For the purpose of pivotally advancing the frame 10 in harmony or accordance with the cutting action of the cutting member 21, suitable mechanism may be provided. In the drawings, this mechanism consists of a pinion 29 loosely mounted upon a shaft 30 journalled in bearings 31 carried by the frame or support 10. The pinion 29 is arranged to mesh with or engage a rack 32 pivoted at 33 upon a stationary bracket 34 carried by the frame 16 and extending in the direction of travel of the swinging frame or support 10; to maintain the rack 32 in operative engagement with the pinion 29 throughout the pivotal path of travel of said frame, a flanged roller 35 is mounted upon said frame 10 in position to constitute a roller bearing for said rack, as is clearly shown in Figs. 1 and 2. Any suitable means may be provided for actuating the pinion 29, which means, as shown in the drawings, may consist of a train of gearing 36 and a countershaft 37 journalled on the frame 10 and provided, for instance, with stepped pulleys 38; the latter are arranged to be connected by means of a belt 39 with a co-operating series of stepped pulleys 40 mounted upon a shaft 41 journalled upon the frame 10. The shaft 41 carries a pulley 42 connected by means of a belt 43 with another pulley 44 mounted by means of a shaft 45 upon the frame 10, said shaft 45 further having fixed thereon a pulley 44ᵃ which contacts with the belt 25, which latter constitutes the driving medium whereby said pulleys 44, 42 and the train of gearing 36 is driven. It will be understood that this arrangement is only an example and that other arrangements suitable for the intended purpose may be substituted if desired. To operatively connect and disconnect the pinion 29 from the gearing 36, a conventional clutch 46 may be provided on the shaft 30 and may be actuated by means of a lever 47 pivoted at 48 upon the frame 10 and connected by means of a link 49 with a detent 50. The latter is fixed upon a shaft 51 journalled in bearings 52 upon the frame 10 and terminating in the form of an operating handle 53, as shown in Figs. 2 and 4. In addition to its other functions, the detent 50 is arranged to co-operate with a series of teeth 54 located at intervals upon the stationary frame 16 for the purpose of maintaining the frame 10 and the elements carried thereby in an inoperative position, as will be more fully set forth hereinafter. The detent 50 is further arranged to co-operate with a cam 55 located at the proper point upon said frame 16 in a manner to automatically bring about the disengagement of the clutch 46 at the finish of the cutting operation, said cam being preferably adjustable upon said frame 16. For the purpose of adjusting the suspended frame 10 in directions toward and away from the pivot trunnions 14 to compensate for wear in the rotatable cutting member 21, said trunnions may be combined with an eccentric 56 rotatably mounted in a bearing 57 which, in such case, comprises a part of the frame 10 or, specifically, in the illustrated example, of the bracket 28 thereof. With this arrangement, as the trunnions 14 are rotated about their common axis relatively to the frame 10, the eccentric 56 will be correspondingly moved relatively to the bearing 57 and accordingly will shift or adjust the frame 10 in the direction of its length or, in other words, in directions toward and away from its pivot, whereby the rotatable cutting member 21 is correspondingly adjusted. Any conventional mechanism may be provided for actuating the trunnions 14 to effect the described operation of the eccentric 56 and the adjustment of the frame 10; for instance, as shown in the drawings, worm gearing 58 may be provided for this purpose and may be operated by means of a rod 59 journalled in bearings 60 and provided with a hand-wheel 61 or its equivalent, the latter being within easy reach of the attendant.

The marble or other stone to be cut may be supported in operative relation to the cutting member 21 in any suitable manner as, for instance, upon a stationary table 62 provided at its forward edge with a vertically adjustable flange 63 and cut away, as indicated at 64, for the accommodation of the rotary cutting member 21. Suitable auxiliary tables 68 provided with rollers 69 may be provided at opposite sides of the main table 62 for the purpose of facilitating the introduction of the material to be cut to the main table and its removal therefrom.

In practice, the marble, stone or other material to be cut is placed in proper position upon the table 62, it being understood that the swing saw is in an inoperative position, rearwardly inclined away from said table, in which position said swing saw is held by reason of the engagement of the detent 50 with one of the teeth 54 of the stationary frame 16. In this position of the parts, the clutch 46 is operatively disengaged so that the pinion 29 is inactive, even though the gearing 36 may be in operation. As the operating handle 53 is actuated to disengage the detent 50 from the tooth 54 in order to permit the frame and its parts to swing forwardly, the clutch 46 at the same time will be automatically engaged and thereby will cause the pinion 29 to be operated by the gearing 36 and caused to travel along the rack 32. It will be understood that the final engagement of the clutch 46 is effected after the cutting member 21 has been brought into contact with the work to be cut and that thereafter the frame 10 is advanced in a pivotal path in accordance with the cutting action of said cutting member. As soon as the cut has been completed, the clutch 46 is disengaged, preferably in an automatic manner, by means of the detent 50 in co-operation with the cam 55, and the swing frame 10 with the elements carried thereby, including the cutting member 21, is swung back manually to its inoperative position and held therein by the engagement of the detent 50 with a tooth 54. As soon as the work has been adjusted to a new position, a successive cut is completed in the manner previously described.

The action of the saw is efficient and rapid and its adjustment to an inoperative position after a cut has been completed, as well as its return to an operative position to effect a new cut, may be brought about quickly and in a minimum of time and with little manual effort. The action of the cutting member 21 is such that the material is not only cut into sections, as predetermined by the requirements of each particular case, but the surfaces of said material at the cut are smoothed or polished, this being particularly the case if the material being cut is marble or other stone.

The improved swing saw is extremely simple in construction and efficient and economical in operation and may be erected and installed at a minimum cost.

Various modifications may be made within the scope of the claim without departing from the nature of my invention.

I claim:

A swing saw comprising a pivotally suspended frame, a cutting member rotatably mounted thereon, means for operating said cutting member and for advancing said frame in its pivotal path in accordance with the cutting action of said cutting member, a stationary frame and shoes carried by said pivotally suspended frame in travelling engagement with said stationary frame whereby said pivotally suspended frame is maintained against deviation from its pivotal path.

In testimony whereof I have hereunto set my hand.

JULIUS WEGNER.